United States Patent Office 3,064,184
Patented Nov. 13, 1962

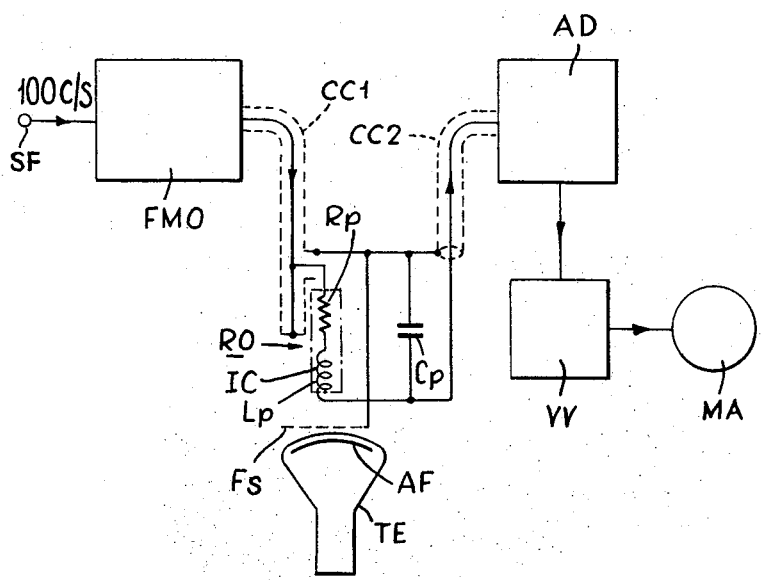

3,064,184
APPARATUS FOR MEASURING THE THICKNESS OF ELECTRICALLY CONDUCTING FILMS
John Edwin Robert Watkiss, London, England, assignor to Associated Electrical Industries (Woolwich) Limited, a British company
Filed June 2, 1959, Ser. No. 817,554
Claims priority, application Great Britain June 11, 1958
4 Claims. (Cl. 324—40)

This invention relates to apparatus for measuring the thickness of a film of electrically conducting material which is supported on a body of electrically insulating material. Although not so limited the invention is particularly suitable to be used for supervising a process of depositing a metal film, of aluminium for instance, on the envelope of an electric discharge device, and is especially advantageous in monitoring the production of backing films for the phosphor layers on the screen portion of television tubes made of glass.

For this purpose it has already been known to use an inductor coil which is coupled to the film and forms a tuning element of an oscillator so that measurement of the thickness of the film can be derived from the output of a circuit which varies with the actual frequency of the oscillator.

However, in such arrangements where the inductor coil is at a distance determined by the insulating film supporting body, the effect of the film as reflected by the inductor coil upon the tuning of the oscillator, therefore also the measuring result, are influenced by the mutual inductance value which depends upon the distance as determined by the thickness of the insulating support. Another disadvantage of the known measuring apparatus is that the range of film thickness for which useful measuring results can be obtained is rather limited where reflected reactance alone supplies an effect which can be employed for accurate measurements.

These difficulties are overcome and accurate measurements which are free from errors due to variations in the thickness of an insulating supporting body can be obtained for a wider range of film thicknesses than has been possible heretofore by the present invention which eliminates the influence of the mutual inductance or at least reduces it to a permissible value.

The invention generally resides in an apparatus for measuring the thickness of a film of electrically conducting material adhering to a body of insulating material comprising a resonant circuit with an inductor coil, said coil being arranged for coupling to the film to be measured, and said circuit being connected to a radio frequency voltage source which is adapted to supply a substantially constant amplitude, and to have its frequency swept over a range including the frequency to be expected when the circuit is loaded with the reactance reflected in said coil from said film, a capacitance being connected to the said circuit, and a means being provided for measuring the voltage appearing across said capacitance, thereby the reflected reactance-resistance ratio, and the thickness of the film.

In this manner the measurement of film resistance which indicates the film thickness is guarded against errors due to a variation in mutual inductance.

Another advantage of the invention is that the measuring result is not dependent upon the linearity of the mutual conductance to grid voltage characteristic of thermionic valves used in the oscillator circuit so that valve ageing or replacements can cause no measuring errors, while changes in the sensitivity of the arrangement due to valve ageing or replacement can be readily compensated by conventional means.

In a practical embodiment the components of the resonant circuit are selected to limit the change in its frequency due to the reactance loading by the film through the inductor coil to a value less than 1/20 of the frequency of the unloaded circuit and the sweep frequency may be chosen to be of the order of 100 cycles per second for instance.

More details will be apparent and the invention will be better understood from the following description referring to the accompanying drawing, the single FIGURE of which shows diagrammatically and by way of example a simple circuit arrangement of an apparatus according to the invention.

Referring to the drawing a resonant circuit RO is coupled to an F.M. oscillator known per se and indicated at FMO. The actual resonant frequency of circuit RO depends upon its inductance and capacitance indicated at $Lp$ and $Cp$, and its Q value also depends upon the resistance indicated at $Rp$. IC denotes the inductor coil which is coupled to the aluminium film AF on the inner surface of the envelope of a television tube TE, a Faraday screen Fs being interposed between the inductor coil IC and the aluminium film AF in order to minimise changes in the capacity effect of the inductor coil due to the proximity of the film. The oscillator is supplied from terminal SF with a sweep frequency, at a repetition rate of 100 c.p.s. in this case, which is such that the actual frequency always passes through the resonant frequency of the RO circuit whatever the loading to be expected via $Lp$.

The oscillator coil may be wound on a core of low loss high frequency material, such as known under the trade name Ferroxcube, and arranged between the poles of an electromagnet, so that by varying the energisation of the electromagnet the incremental permeability of the core can be adjusted.

The circuit RO is coupled to the oscillator FMO preferably through a single turn winding (not shown) at the end of a co-axial cable CC1. The frequency of the unloaded circuit may be of the order of 5 mc./s. and may be swept over the range of say ± 250 kc./s.

By a coaxial cable CC2 a voltage proportional to the voltage across the capacitance $Cp$ is supplied to an amplifier having a linear characteristic and a phase discriminator known per se and indicated at AD. The discriminator may be of the Foster-Seeley type and is arranged to have a linear characteristic over the frequency sweep range, that is 250 kc./s. on each side of the unloaded oscillator frequency of 5 mc./s. in this case, the centre point of the discriminator frequency being adjusted to coincide with the unloaded frequency of RC.

The voltage output from the discriminator is directly proportional to the reflected reactive component and inversely proportional to the reflected resistive component. Thus the influence of the mutual inductance between film and measuring coil is eliminated, as will be seen later. In the present case the discriminator output will comprise simple pulses at 200 c./s. repetition rate and the peak amplitude of the pulses will be proportional to the thickness of the film AF. These pulses are smoothed and applied to a valve voltmeter VV, the output of which is measured by a microammeter MA.

A variable resistor can be arranged in the circuit of MA to allow sensitivity adjustment.

The theory upon which the elimination of mutual inductance from the measuring result is based in order to obtain with the present invention an increase in the accuracy and range of film thickness measurements as compared with existing methods will appear from the following.

The resultant voltage value which is measured by the arrangement according to this invention is proportional to $$\frac{X_s'}{R_s'}$$

where $X_s'$ is the reflected inductance and $R_s'$ is the reflected resistance. $X_s'$ and $R_s'$ are proportional to $X_s$ and $R_s$ the reactive and resistive components of the film.

The presence of the film causes an impedance change of the inductor coil which is expressed by:

$$R_s' + X_s' = \frac{\omega^2 M^2 R_s}{Z_s^2} + \frac{\omega^2 M^2 X_s}{Z_s^2} \qquad (1)$$

where $\omega$ is the angular velocity, $M$ is the mutual inductance and $Z_s$ is the inductor impedance.

With an arrangement according to the invention the measured voltage value $V_m$ corresponds to the ratio between the voltage values which are proportional to the reflected reactance and resistance respectively so that the mutual inductance of the measuring coil which influences equally both voltages is eliminated as can be seen from the following equation:

$$V_m = \frac{V_x}{V_R} = \frac{k_1 X_s'}{k_2 R_s'} = \frac{k_1 \cdot \frac{\omega^2 M^2}{Z_s^2} X_s}{k_2 \cdot \frac{\omega^2 M^2 R_s}{Z_s^2}} = k_3 \frac{X_s}{R_s} \qquad (2)$$

where $k_1$, $k_2$ and $k_3$ are constants.

As the reactive component $X_s$ is not a function of the film thickness $t$ and the resistance $R_s$ is inversely proportional to the film thickness it follows that:

$$V_m = \frac{V_x}{V_R} = k_4 \cdot t \qquad (3)$$

where $k_4$ is a constant.

It has also to be noted that the resistance reflected in the inductor coil is much greater than the inherent resistance of this coil. Thus the Q value of the "loaded" tuned circuit and therefore the voltage across the capacitor CP is inversely proportional to the reflected resistance.

The microammeter MA can be calibrated in film thickness units, such as multiples of A. In a practical embodiment films up to at least 6,000 A. thickness could be measured. Under constant temperature conditions the accuracy obtained was within 4% for 270 A. and within 1.5% for over 500 A. A further advantage is that the voltage changes linearly with the film thickness within a wide range so that a linear instrument scale can be used up to at least 2,000 A. The measured values were equally accurate for envelopes of practically all thicknesses used on commercial television tubes at present.

What I claim is:

1. Apparatus for measuring the thickness of a non-magnetic electrically conducting film which adheres to a base of electrically insulating material comprising a resonant circuit, a radio frequency voltage source and a phase discriminator connected to the resonant circuit, the said resonant circuit including a capacitor and an inductor coil which latter is arranged for coupling to the film to be measured, the said source being adapted to supply a voltage of substantially constant amplitude to the resonant circuit and having its frequency swept over a range including the resonant frequency to be expected when the resonant circuit is loaded with the reactance reflected in said coil from said film, the said phase discriminator having its input connected across the capacitor in the resonant circuit, and having its output dependent upon both the magnitude of the voltage appearing across the capacitor and the frequency change of the resonant circuit due to the reactance reflected by the film into the coil, means being provided for measuring and indicating the peak output from the discriminator at the resonant condition of the loaded resonant circuit, which output is proportional to the reflected reactance/resistance ratio and hence to the thickness of the film.

2. Apparatus as claimed in claim 1, wherein the inherent resistance of the inductor coil is considerably smaller than the value of the resistance reflected from the film.

3. Apparatus as claimed in claim 1 including circuit components being selected to cause during the measuring operation, a frequency change of the loaded resonant circuit which is less than one-twentieth of the frequency of the unloaded resonant circuit.

4. Apparatus as claimed in claim 1 in which the output from the discriminator is connected to a valve voltmeter, and the time constant of the discriminator is large compared with the periods of the voltage pulses appearing across the capacitor in the resonant circuit.

References Cited in the file of this patent

UNITED STATES PATENTS

| | | |
|---|---|---|
| 2,572,908 | Brenholdt | Oct. 30, 1951 |
| 2,587,631 | Kuehne | Mar. 4, 1952 |
| 2,797,386 | Callan | June 25, 1957 |
| 2,809,346 | Archer | Oct. 8, 1957 |
| 2,894,203 | Cory | July 7, 1959 |

OTHER REFERENCES

"The Review of Scientific Instruments," Volume 29, No. 5, May 1958, pages 411–415; article by Hanysz.